United States Patent
Tohgi et al.

(10) Patent No.: US 7,430,564 B2
(45) Date of Patent: Sep. 30, 2008

(54) PERFORMANCE INFORMATION REPRODUCING APPARATUS AND METHOD AND PERFORMANCE INFORMATION REPRODUCING PROGRAM

(75) Inventors: Yutaka Tohgi, Hamakita (JP); Ken'ichi Yamauchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 582 days.

(21) Appl. No.: 10/757,120

(22) Filed: Jan. 14, 2004

(65) Prior Publication Data
US 2004/0148300 A1 Jul. 29, 2004

(30) Foreign Application Priority Data
Jan. 14, 2003 (JP) .............................. 2003-006114

(51) Int. Cl.
*G06F 17/00* (2006.01)
*G06F 13/38* (2006.01)
(52) U.S. Cl. ..................................... 707/104.1; 710/65
(58) Field of Classification Search ................. 707/100, 707/1, 104.1, 200; 84/470 R, 601; 345/23, 345/27; 360/70; 386/25, 95, 94, 96; 434/307 A; 710/65; 365/185.11
See application file for complete search history.

(56) References Cited

U.S. PATENT DOCUMENTS

| | | | |
|---|---|---|---|
| 4,942,551 A * | 7/1990 | Klappert et al. ............... | 710/65 |
| 5,131,311 A * | 7/1992 | Murakami et al. ...... | 434/307 A |
| 5,854,619 A | 12/1998 | Kato | |
| 6,262,915 B1 * | 7/2001 | Kihara et al. .......... | 365/185.11 |
| 2004/0126094 A1 * | 7/2004 | Kotani ......................... | 386/95 |

FOREIGN PATENT DOCUMENTS

| JP | 10-247091 | 9/1998 |
|---|---|---|
| JP | 2002-203117 | 7/2002 |

* cited by examiner

*Primary Examiner*—Shahid Al Alam
*Assistant Examiner*—Fred I Ehichioya
(74) *Attorney, Agent, or Firm*—Pillsbury Winthrop Shaw Pittman LLP

(57) ABSTRACT

There is provided a performance information reproducing apparatus that is capable of realizing desired synchronized reproduction of a plurality of types of data, such as music and images with ease. An external storage device stores a musical tone data file, in which musical tone information is recorded, and at least one media data file, in which at least one other type of media information is recorded, together with a management file in which reading manners of the musical tone data file and the media data files are recorded. A CPU generates, based on the musical tone data file and the management file, reproduction data that designates the musical tone information and the media data file to be reproduced, using designation information in a same format as the musical tone information.

9 Claims, 12 Drawing Sheets

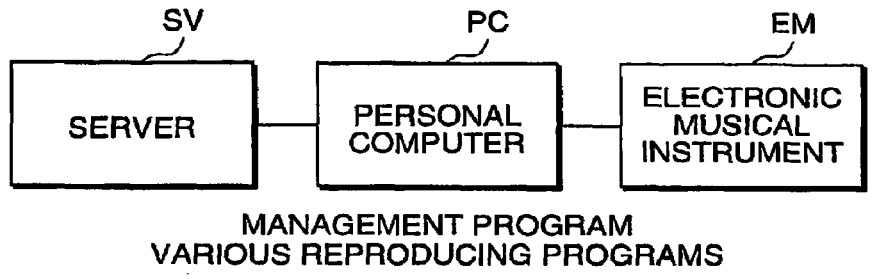
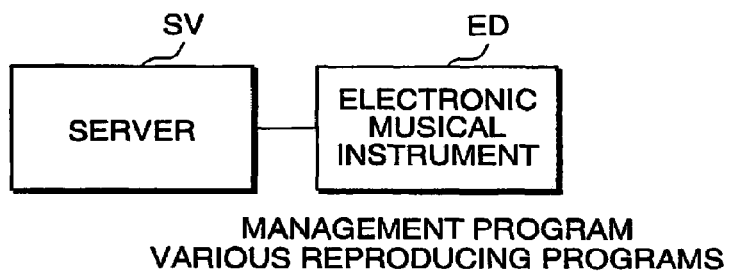
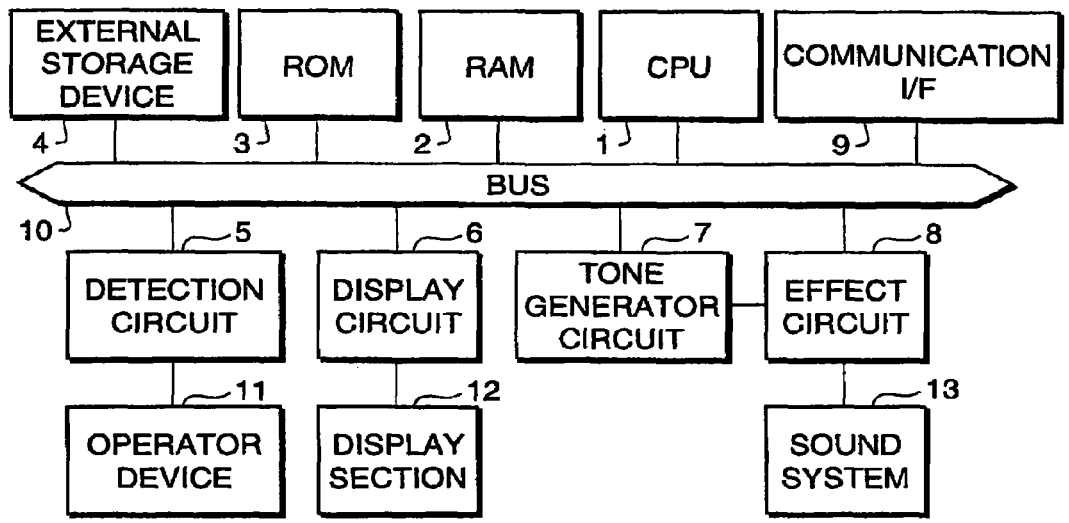

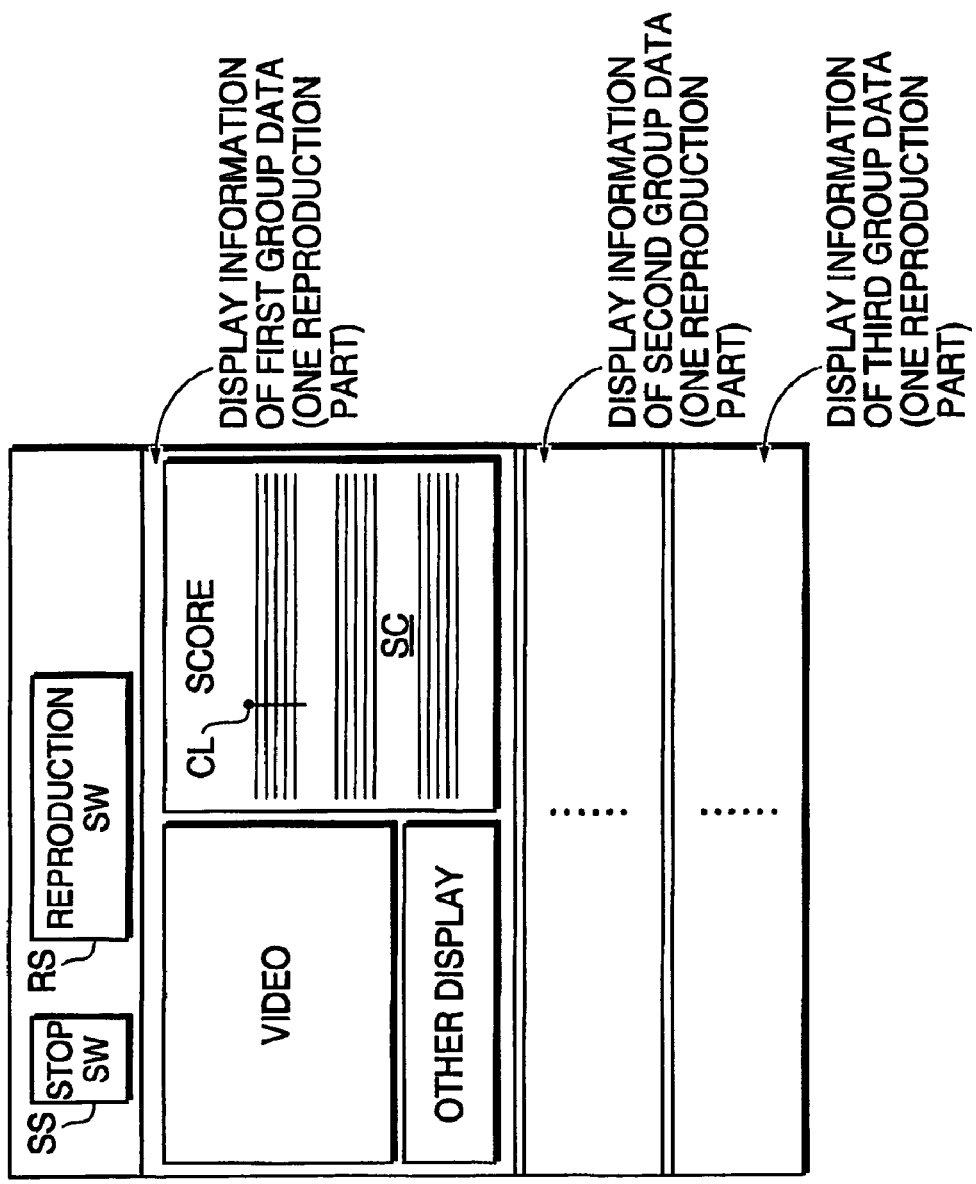

REPRODUCTION DATA STORED IN MP DATA STORAGE SECTION

REPRODUCTION DATA STORED IN VP DATA STORAGE SECTION

FIG. 9A

MIDI/SCORE TRACK MTr, STr

| MIDI CLOCK TIMING MCp1 | MIDI EVENT EVp1 | MIDI CLOCK TIMING MCp2 | MIDI EVENT EVp2 | .... |

FIG. 9B

AUDIO TRACK ATr

| MIDI CLOCK TIMING MCq1 | DESIGNATED AUDIO FILENAME AFq1 | MIDI CLOCK TIMING MCq2 | DESIGNATED AUDIO FILENAME AFq2 | .... |

FIG. 9C

VIDEO TRACK VTr

| MIDI CLOCK TIMING MCr1 | DESIGNATED VIDEO FILENAME VFr1 | MIDI CLOCK TIMING MCr2 | DESIGNATED VIDEO FILENAME VFr2 | .... |

PERFORMANCE INFORMATION REPRODUCING APPARATUS AND METHOD AND PERFORMANCE INFORMATION REPRODUCING PROGRAM

BACKGROUND OF THE INVENTION

1. Field of the Invention

This invention relates to a performance information reproducing apparatus and method, and a performance information reproducing program that reproduces a plurality of types of performance information (media information) in synchronism with each other, and in particular to a performance information reproducing apparatus and method, and a performance information reproducing program that are designed to generate reproduction data used to read out performance information to be reproduced in synchronism with each other.

2. Description of the Related Art

Conventionally, there is known an apparatus which generates data for synchronized reproduction of a plurality of types of data, such as music and images, in timing in which musical performance is given and carries out synchronized reproduction of such various types of data based on the generated data, as disclosed by Japanese Laid-Open Patent Publication (Kokai) No. H06-124093.

However, the conventional apparatus generates such various types of data in advance so that the data will be reproduced in accordance with the timing of musical performance, and therefore there is the problem that it is difficult to carry out synchronized reproduction of various types of performance information (media information), such as music and images, when some of such data has been changed or a new type of data has been added.

SUMMARY OF THE INVENTION

It is an object of the present invention to provide a performance information reproducing apparatus and method, and a performance information reproducing program that are capable of realizing desired synchronized reproduction of a plurality of types of data, such as music and images with ease.

To attain the above object, in a first aspect of the present invention, there is provided a performance information reproducing apparatus comprises a file storage device that stores a musical tone data file, in which musical tone information is recorded, and at least one media data file, in which at least one other type of media information is recorded, together with a management file in which reading manners of the musical tone data file and the media data files are recorded, and a reproduction data generating device that generates, based on the musical tone data file and the management file, reproduction data that designates the musical tone information and the media data file to be reproduced, using designation information in a same format as the musical tone information.

With the performance information reproducing apparatus according to the first aspect, without carrying out difficult processing such as specially generating various media information in advance so that the media information is reproduced in accordance with reproduction timing of musical tone information, read manners (filenames, timing, and the like) for various media information are set in advance in a management file, and when reproduction is carried out, the management file is used to easily generate reproduction data for reading the various media information and the various media information can then be read out in accordance with the reproduction data. As a result, synchronized reproduction of media information can be realized with ease. Further, an editing operation for a management file that specifies reproducing manners of the various media information is simple, so that by editing the management file, for example, to change some of the data files and/or add new data files or to change the reproduction timing of respective media files, it is possible to flexibly set a desired reproducing manner.

Preferably, the file storage device stores a plurality of media data files, in which a plurality of types of media information are recorded, respectively.

Preferably, the plurality of media data files, in which the plurality of types of media information are recorded, respectively, comprise an audio data file, and a video data file.

Preferably, the management file comprises file names of the media data file, and pieces of timing data indicative of timing of start of reproduction of the media data file, the—file names and the pieces of timing data being arranged in order of reproduction.

Preferably, the musical tone data file comprises MIDI events, and pieces of timing data indicative of MIDI clock timing of start of processing the MIDI event, the MIDI events and the pieces of timing data being arranged in order of reproduction.

Preferably, the reproduction data comprises file names of the media data file, and pieces of timing data indicative of MIDI clock timing of start of reproduction of the media data file, the file names and the pieces of timing data being arranged in order of reproduction.

Preferably, the timing data indicative of MIDI clock timing of start of reproduction of the media data file is generated from data indicative of timing recorded in the management file.

To attain the above object, in a second aspect of the present invention, there is provided a performance information reproducing apparatus comprises a file storage device that stores a musical tone data file, in which musical tone information is recorded, and at least one media data file, in which at least one other type of media information is recorded, together with a management file in which reading manners of the musical tone data file and the media data files are recorded, a reproduction data generating device that generates, based on the musical tone data file and the management file, reproduction data that designates the musical tone information and the media data file to be reproduced, using designation information in a same format as the musical tone information, a reproduction data storage device that stores the generated reproduction data, a reading device that reads the reproduction data from the reproduction storage device in accordance with reproduction clock for the musical tone information, and a reproducing device that reads the media data file designated by the read reproduction data, and reproduces the musical tone information in the reproduction data and the media information in the media data file in synchronism with each other.

Preferably, the file storage device stores a plurality of media data files, in which a plurality of types of media information are recorded, respectively.

Preferably, the plurality of media data files, in which the plurality of types of media information are recorded, respectively, comprise an audio data file, and a video data file.

Preferably, the management file comprises file names of the media data file, and pieces of timing data indicative of timing of start of reproduction of the media data file, the file names and the pieces of timing data being arranged in order of reproduction.

Preferably, the musical tone data file comprises MIDI events, and pieces of timing data indicative of MIDI clock timing of start of processing the MIDI event, the MIDI events and the pieces of timing data being arranged in order of reproduction.

Preferably, the reproduction data comprises file names of the media data file, and pieces of timing data indicative of MIDI clock timing of start of reproduction of the media data file, the file names and the pieces of timing data being arranged in order of reproduction.

Preferably, the timing data indicative of MIDI clock timing of start of reproduction of the media data file is generated from data indicative of timing recorded in the management file.

Preferably, the reproduction clock for the musical tone information is MIDI clock, and whenever timing corresponding to the timing data indicative of MIDI clock timing of start of reproduction of the media data file is reached, the media data file having the file name corresponding to the MIDI clock timing is read from the file storage device.

To attain the above object, in a third aspect of the present invention, there is provided a performance information reproducing method for a performance information reproducing apparatus, comprises a file storage step of storing a musical tone data file, in which musical tone information is recorded, and at least one media data file, in which at least one other type of media information is recorded, together with a management file in which reading manners of the musical tone data file and the media data files are recorded, and a reproduction data generating step of generating, based on the musical tone data file and the management file, reproduction data that designates the musical tone information and the media data file to be reproduced, using designation information in a same format as the musical tone information.

To attain the above object, in a fourth aspect of the present invention, there is provided a performance information reproducing method for a performance information reproducing apparatus, comprises a file storage step of storing in a file storage device a musical tone data file, in which musical tone information is recorded, and at least one media data file, in which at least one other type of media information is recorded, together with a management file in which reading manners of the musical tone data file and the media data files are recorded, a reproduction data generating step of generating, based on the musical tone data file and the management file, reproduction data that designates the musical tone information and the media data file to be reproduced, using designation information in a same format as the musical tone information, a reproduction data storing step of storing the generated reproduction data in a reproduction storage device, a reading step of reading the reproduction data from the reproduction storage device in accordance with reproduction clock for the musical tone information, and a reproducing step of reading the media data file designated by the read reproduction data, and reproducing the musical tone information in the reproduction data and the media information in the media data file in synchronism with each other.

To attain the above object, in a fifth aspect of the present invention, there is provided a performance information reproducing program executed by a computer, comprises a file storage module for storing in a file storage device a musical tone data file, in which musical tone information is recorded, and at least one media data file, in which at least one other type of media information is recorded, together with a management file in which reading manners of the musical tone data file and the media data files are recorded, a reproduction data generating module for generating, based on the musical tone data file and the management file, reproduction data that designates the musical tone information and the media data file to be reproduced, using designation information in a same format as the musical tone information, a reproduction data storing module for storing the generated reproduction data in a reproduction storage device, and a reading module for reading the reproduction data from the reproduction storage device.

To attain the above object, in a sixth aspect of the present invention, there is provided a performance information reproducing program executed by a computer, comprises a file storage module for storing in a file storage device a musical tone data file, in which musical tone information is recorded, and at least one media data file, in which at least one other type of media information is recorded, together with a management file in which reading manners of the musical tone data file and the media data files are recorded, a reproduction data generating module for generating, based on the musical tone data file and the management file, reproduction data that designates the musical tone information and the media data file to be reproduced, using designation information in a same format as the musical tone information, a reproduction data storing module for storing the generated reproduction data in a reproduction storage device, a reading module for reading the reproduction data from the reproduction storage device in accordance with reproduction clock for the musical tone information, and a reproducing module for reading the media data file designated by the read reproduction data, and reproducing the musical tone information in the reproduction data and the media information in the media data file in synchronism with each other.

The above and other objects, features, and advantages of the invention will become more apparent from the following detailed description taken in conjunction with the accompanying drawings.

BRIEF DESCRIPTION OF THE DRAWINGS

FIGS. 1A and 1B are block diagrams showing examples of the entire construction of a performance information reproduction system to which a performance information reproducing apparatus according to a first embodiment of the present invention is applied, in which:

FIG. 1A shows an example where a personal computer PC having a communication function is used in the performance information reproduction system as the performance information reproducing apparatus; and FIG. 1B shows an example where an information processing apparatus ED, such as an electronic musical instrument, dedicated to processing of musical tones is used in the performance information reproduction system as the performance information reproducing apparatus;

FIG. 2 is a block diagram showing the hardware construction of the performance information reproducing apparatus according to the first embodiment;

FIG. 7 is a view showing an example of a page screen displayed during a setting operation of the performance information reproducing apparatus;

FIGS. 8A and 8B are diagrams showing the structures of reproduction data RD generated during the setting operation of the performance information reproducing apparatus, in which:

FIG. 8A shows the structure of the reproduction data RD stored in a reproduction data buffer 2M; and FIG. 8B shows the structure of the reproduction data RD stored in a video control data buffer 2V;

FIGS. 9A to 9C are diagrams showing examples of the contents of the reproduction data RD generated during the setting operation of the performance information reproducing apparatus, in which:

FIG. 9A shows the contents of score track information STr and MIDI track information MTr, FIG. 9B showing the contents of audio track information Atr; and FIG. 9C shows the contents of video track information VTr;

DETAILED DESCRIPTION OF THE PREFERRED EMBODIMENTS

Figure 3:
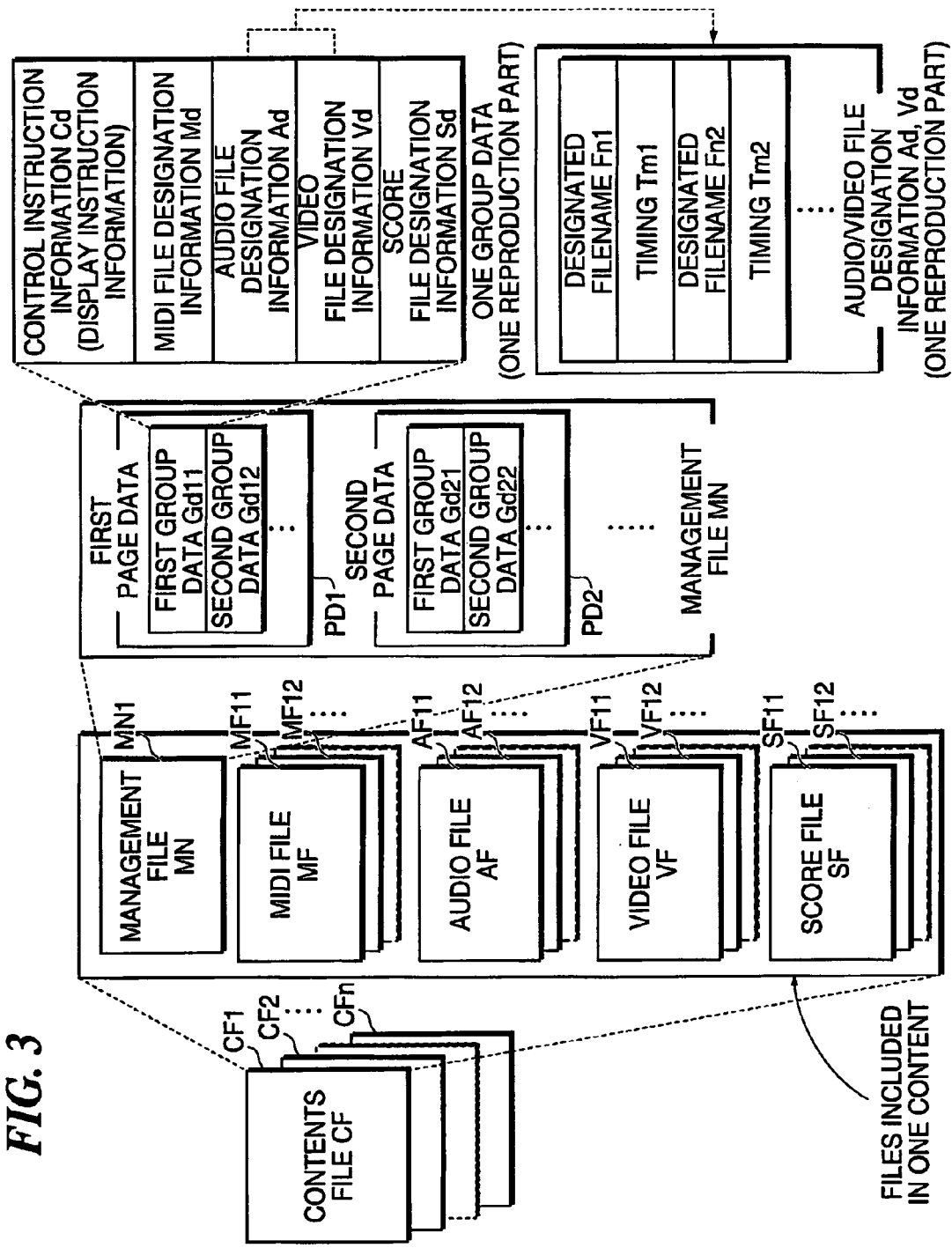
FIG. 3 is a diagram showing the structure of contents files used in performance information reproduction and the structure of management data in the contents files.

The present invention will now be described in detail below with reference to the accompanying drawings showing preferred embodiments thereof. In the drawings, elements and parts which are identical throughout the views are designated by identical reference numerals, and duplicate description thereof is omitted.

It should be noted that the embodiments described below are merely examples, and that a variety of modifications are possible without departing from the scope of the present invention.

FIGS. 1A and 1B are block diagrams showing examples of the entire construction of a performance information reproduction systems to which a performance information reproducing apparatus according to a first embodiment of the present invention is applied. In such a performance information reproduction system, it is possible to use any information processing apparatus insofar as it has a communication function and a performance information processing function. FIGS. 1A and 1B show two typical examples of how such apparatus is applied.

In FIG. 1A, a personal computer PC with a communication function is used in the performance information reproduction system as a performance information reproducing apparatus. Various media information (hereinafter also referred to as "performance information") such as musical tone information and image information is distributed from a server computer SV to the personal computer PC via a universal communication network such as the Internet. The personal computer PC is provided with control programs including a management program and a variety of dedicated media information reproducing programs corresponding to various kinds of media information. In accordance with the management program and media information reproducing programs, the personal computer generates reproduction data (RD), which enables synchronized reproduction of the various media information, and reads out the various media information based on the generated reproduction data (RD) and carries out synchronized reproduction of the same.

Next, out of such reproduction outputs, image output is supplied to a display section of the personal computer PC so that images corresponding to the read out media information based on the reproduction data (RD) are generated, and sound output is supplied to a dedicated information processing apparatus EM for processing of musical tones with a musical tone generating function, such as an electronic musical instrument so that sounds corresponding to the read out media information based on the reproduction data (RD) are generated. It should be noted that the personal computer PC is equipped with a tone generator and a sound system or the like, and hence has a function of outputting sounds based on musical tone information or the like, so that the personal computer PC itself may generate sounds and images corresponding to the various media information without using a separate information processing apparatus EM for outputting sounds, such as an electronic musical instrument.

On the other hand, in FIG. 1B, an information processing apparatus ED dedicated to processing of musical tones, such as an electronic musical instrument, is used in the performance information reproduction system as a performance information reproducing apparatus. This information processing apparatus ED has not only a musical tone information processing function but also a general communication function and various media information processing functions that are based on control programs such as a management program and various kinds of reproducing programs. Various kinds of media information are distributed to the information processing apparatus ED from the server SV via a universal communication network such as the Internet. In accordance with these programs, the information processing apparatus ED generates reproduction data (RD) which enables synchronized reproduction of the various media information, and reads out the various media information based on the generated reproduction data (RD) and carries out synchronized reproduction of the same to generate sound and images corresponding to the various media information.

It should be noted that the performance information reproducing apparatus is not limited to the personal computer PC and the information processing apparatus ED, such as an electronic musical instrument as shown in FIGS. 1A and 1B, but various types of information processing apparatuses that have the same functions as the illustrated ones can be used. In the embodiments described below, the case where the performance information reproducing apparatus (PC, ED) itself has a function of outputting sound is described.

FIG. 2 is a block diagram showing the hardware construction of the performance information reproducing apparatus according to the first embodiment. This performance information reproducing apparatus is comprised of a central processing unit (CPU) 1, a random access memory (RAM) 2, a read only memory (ROM) 3, an external storage device 4, a detection circuit 5, a display circuit 6, a tone generator circuit 7, an effect circuit 8, a communication interface (I/F) 9, and the like, with these components 1 to 9 being interconnected via a bus 10.

The CPU 1 that controls the entire apparatus executes various performance information reproduction processes in accordance with predetermined control programs. The RAM 2 functions as a processing buffer for temporarily storing various information used in such processes, and is comprised, for example, of a contents buffer (2C), a reproduction data buffer (2M), a video reproduction data (video control data) buffer (2V), and the like control programs for causing the CPU 1 to execute the performance information reproduction processes and various data, tables, and the like are stored in the ROM 3. Such control programs include performance information reproducing programs such as a management program (CP), a MIDI reproducing program (MP), an audio reproducing program (AP), a video reproducing program (VP), and a score reproducing program (SP).

The external storage device 4 is a storage means that uses a storage medium such as a hard disk (HD), a compact disc read only memory (CD-ROM), a flexible disk (FD), a magneto-optical disk (MO), a digital versatile disc (DVD), or a memory card. Various control programs related to performance information reproduction and various data can be stored not only in the ROM 3 but additionally or alternatively in the external storage device 4. For example, when a control program is not stored in the ROM 3, by storing the control program in the external storage device 4, such as an HD or a CD-ROM, and loading the program into the RAM 2, the CPU 1 can be made to execute the same operation as in the case where the control program is stored in the ROM 3. It is also possible to implement the performance information reproducing apparatus by installing a performance information reproducing program as a control program in the external storage device 4, which is an HD or the like. By doing so, it becomes easy to add and/or to update or upgrade the control programs.

The detection circuit 5 introduces operation contents of various operators of an operator device 11 connected to the detection circuit 5 into the performance information reproducing apparatus. The operator device 11 is comprised of various setting panel operators such as a character keyboard and a pointing device (such as a mouse), and when the performance information reproducing apparatus is the electronic musical instrument ED, also includes performance operators enabling the user to input performance sounds.

The display circuit 6 controls display contents of a display section 12 connected thereto according to commands from the CPU 1. The display section 12 is comprised of a display for displaying various screens, such as a performance information reproduction screen. This performance information reproduction screen is also called "page screen", and the display state thereof is controlled in accordance with the management program (CP), the video reproducing program (VP), the score reproducing program (SP), and the like.

The tone generator circuit 7 outputs musical tone wave information corresponding to musical tone information to the effect (applying) circuit 8, and the effect circuit 8, which is comprised of a DSP or the like, converts the musical tone wave information and sound wave information into desired sound signals. A sound system 13, which is comprised of a D/A converter, an amplifier, and a speaker, is connected to the effect circuit 8, so that sound signals based on the musical tone information and the sound wave information generated in accordance with the MIDI reproducing program (MP) and/or the audio reproducing program (AP) are converted into analog signals, which are amplified, and outputted as sounds by the sound system 13.

The communication interface (I/F) 9 is connected to a universal communication network such as a local area network (LAN), the Internet, or a telephone line, or connected to a MIDI network for communication with other MIDI apparatuses. Via these networks, various information can be sent to and received from external apparatuses as necessary. For example, various control programs and data can be obtained from an external information processing apparatus and musical tone information such as MIDI data can be obtained from an external MIDI apparatus. For example, in the case where necessary control programs, data, or the like are not stored in the ROM 3 or the external storage device 4, such control programs, data, or the like can be downloaded from the server computer SV or the like via the communication network.

In the performance information reproducing apparatus according to the present embodiment, a number of contents files (hereinafter also referred to simply as "contents") for performance information reproduction are provided in a contents filing section 4F of the external storage device 4. These contents may be obtained from the server computer SV mentioned above or external information processing terminals, or may be generated by editing various data obtained by the present performance information reproducing apparatus. Also, in the case where contents files are stored in advance in the ROM 3, such contents files may be used for performance information reproduction.

FIG. 3 is a diagram showing the structure of contents files used for performance information reproduction and the structure of the management data in the contents files. In the following description, it is assumed that information according to MIDI Standard is used as the musical tone information and the like.

As shown in the leftmost column in FIG. 3, a plurality of contents files CF1, CF2, . . . , CFn are provided as contents for use in the performance information reproducing apparatus. As shown in the second column from the left, the contents files CF each include a management file MN, and a plurality of types of media data files MF, AF, VF, and SF. It should be noted that in the following description, the symbol "CF" represents the contents files as a whole, and the symbol "CFi" represents any single contents file. In the same way, the symbol "MNi" represents the management file of the contents file CFi.

In the illustrated example, the media data files (hereinafter simply "media files") are each comprised of a MIDI file (musical tone information file) MF, an audio file (sound wave information file) AF, a video file (image information file (VF), and a score file SF. A single contents file CF includes a plurality of MIDI files MF11, MF12, . . . audio files AF11, AF12, . . . , video files VF11, VF12, . . . and score files SD11, SF12, . . . (each reference symbol corresponds to the first contents file CF1). It should be noted that in the following description, the symbols "MF", "AF", "VF", and "SF" represent respective media files as a whole and the first suffix "i" that follows these symbols "MF", "AF", "VF", and "SF" is used to indicate the media file corresponding to any single contents file CFi.

As shown in the third column from the left in FIG. 3, a management file MN for each piece of contents (there is one management file per each piece of contents) is comprised of a plurality of page data PD1, PD2, . . . with each page data having a plurality of group data Gd11, Gd12, . . . , Gd21, Gd22, . . . . Each group data (one reproduction part data) Gd is set on a group-by-group basis, each group (k) being a unit by which a user can separately designate media files to be reproduced using that group data Gd. Each group (k) is also referred to as "one reproduction part".

Each group data (single reproduction part) Gd represents a "blueprint" of reproduction data in one reproduction part expressed in a user-definable page description language, such as XML (eXtensible Markup Language) and, as shown in an upper part of the rightmost column in FIG. 3, is comprised of control instruction (display instruction) information Cd and a plurality of media file designation information Md, Ad, Vd, and Sd. The media file designating information Md, Ad, Vd, and Sd are for designating media files MF, AF, VF, and SF to be reproduced corresponding to that group data (one reproduction part) Gd on a group-by-group basis.

The control instruction information (display instruction information) Cd includes display instruction information designating a display state such as display size and display position for each of data designated for reproduction by the present group (present reproduction part) (k) to be displayed on a page screen of the display section 12. The control instruction information also includes display data for the title of the group, brief comments, and the like. The display data may include the name and initial still image of a media file to be displayed first in a display area (window) for the designated media data. The control instruction information Cd may also include setting information such as timing setting information for setting MIDI clock timing in the case where information, such as MIDI file designation information Md that specifies MIDI clock timing is not present.

In the illustrated example, the MIDI file designation information Md, audio file designation information Ad, video file designation information Vd and score file designation information Sd are included as the media file designation information. A MIDI file MF, an audio file AF, a video file VF, and a score file SF to be reproduced are designated by the media file designation information Md, Ad, Vd, and Sd on a group (reproduction part) (k) on a group-by-group (reproduction part) basis.

As shown in the lower part of the rightmost column in FIG. 3, out of the media file designation information, the audio file designation information and video file designation information (for one reproduction part) Ad, Vd that designate audio and video files AF, VF are comprised of pairs of designated filename data Fn1, Fn2, ... and timing data Tm1, Tm2 indicative of timing in which reproduction of the audio file AF and the video file VF designated by the filename data Fn1, Fn2, ... is to start, with such pairs being arranged in the order of reproduction start timing. Each timing data Tm1, Tm2, can designate the reproduction start timing of the designated video file VF using any desired method, such as by designating a number of bars and a number of beats.

Figure 4:
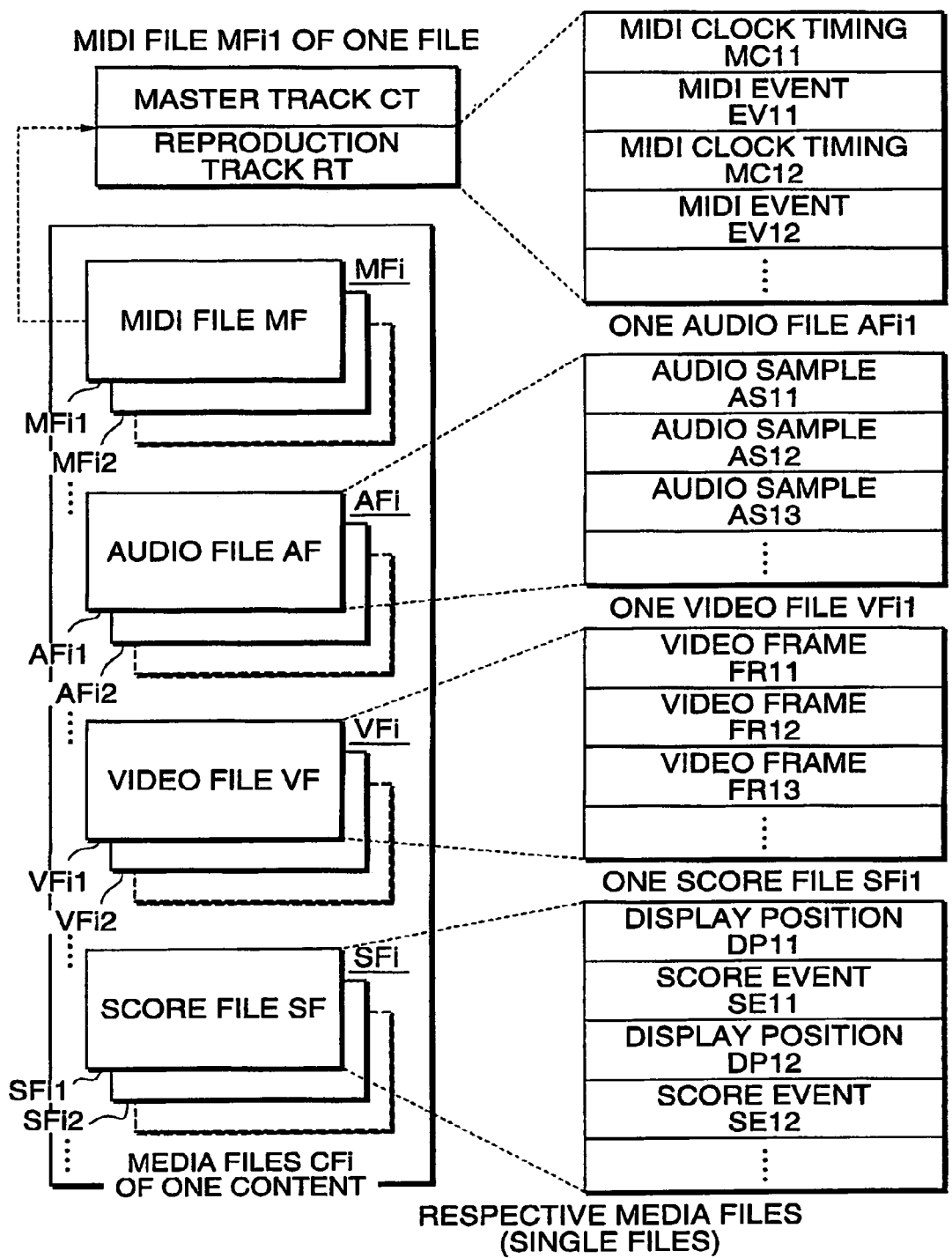
FIG. 4 is a diagram showing the structures of respective media files (for one file)

Next, FIG. 4 is a diagram showing the structure of each media file. Each contents file CFi includes a plurality of types of media files. As shown in the left column in FIG. 4, for example, the types of media files are the MIDI file MF, the audio file AF, the video file VF, and the score file SF as mentioned above. These file types are each comprised of a file group MFi, AFi, VFi, or SFi of a plurality of files MFi1, MFi2, ..., AFi1, AFi2, ..., VFi1, VFi2, ..., or SFi1, SFi2, ...

As shown in an upper-left part of FIG. 4, each MIDI file (single file) MFia is comprised of a master track CT, and a reproduction track RT. The symbol "a" of each MIDI file MFia represents an arbitrary file in a file group i, and in FIG. 4 the contents of a first MIDI file MFi1 (a=1) in the file group i is shown. The master track CT has recorded therein basic data (for example, tempo, key, and composer name) relating to musical tone information (musical composition information) of the MIDI file MFi. The reproduction track RT has recorded therein the contents of that musical tone information (musical composition information). That is, as shown in the uppermost part of the right column in FIG. 4 (in which the contents of the reproduction track RT of the first MIDI file MFi1 are shown), the musical tone information (musical composition information) is comprised of pairs of MIDI clock timing data MC11, MC12, ..., and MIDI events EV11, EV12, ... occurring in the MIDI clock timing MC11, MC12, ... are arranged in the order of the MIDI clock timing.

As shown in the second part of the right column (in which the contents of the first audio file Afi1 in FIG. 4 are shown), each audio file AFia is comprised of a plurality of audio samples AS11, AS12, AS13 that are arranged in the order of reproduction, with the consecutive audio samples AS11, AS12, AS13 representing sound information such as voices, instrument sounds, and natural sounds as waves.

As shown in the third part of the right column (in which the contents of the first video file Vfi1 in FIG. 4 are shown), each video file VFia is comprised of a plurality of video frames FR11, FR12, FR13, ... that are arranged in the order of reproduction. Each video frame FR11, FR12, FR13, ... may represent an image (scene) that is independent of other video frames, like a still image, or may represent an image (scene) that is related to preceding and succeeding frames as in a moving image (animation).

As shown in the lowest part of the right column (in which the contents of the first score file Sfi1 in FIG. 4 are shown), each score file SFia is comprised of pairs of display positions DP11, DP12, ... (of a changeable score display part) on a score represented by score information in the score file SF, and score events SE11, SE12, ... that occur at the respective corresponding display positions DP11, DP12, ..., with the pairs being arranged in the order of display positions.

Next, a description will be given of the setting operation and generation of reproduction data by the performance information reproduction apparatus according to the present embodiment.

Whenever performance information reproduction is carried out, the performance information reproducing apparatus enters a setting operation mode, in which reproduction data RD for synchronized reproduction of the media information in media files MF, AF, VF, and SF is generated from the MIDI file MF and other types of media files such as audio, video, and score files AF, VF, SF. Then, the apparatus enters a reproduction operation mode, in which the reproduction data RD is used to reproduce the other media information in the media files Af, VF, and SF in a reproducing manner according to the contents of the management file MN, in synchronism with reproduction of musical tones according to the musical tone information in the MIDI file.

Figure 5:
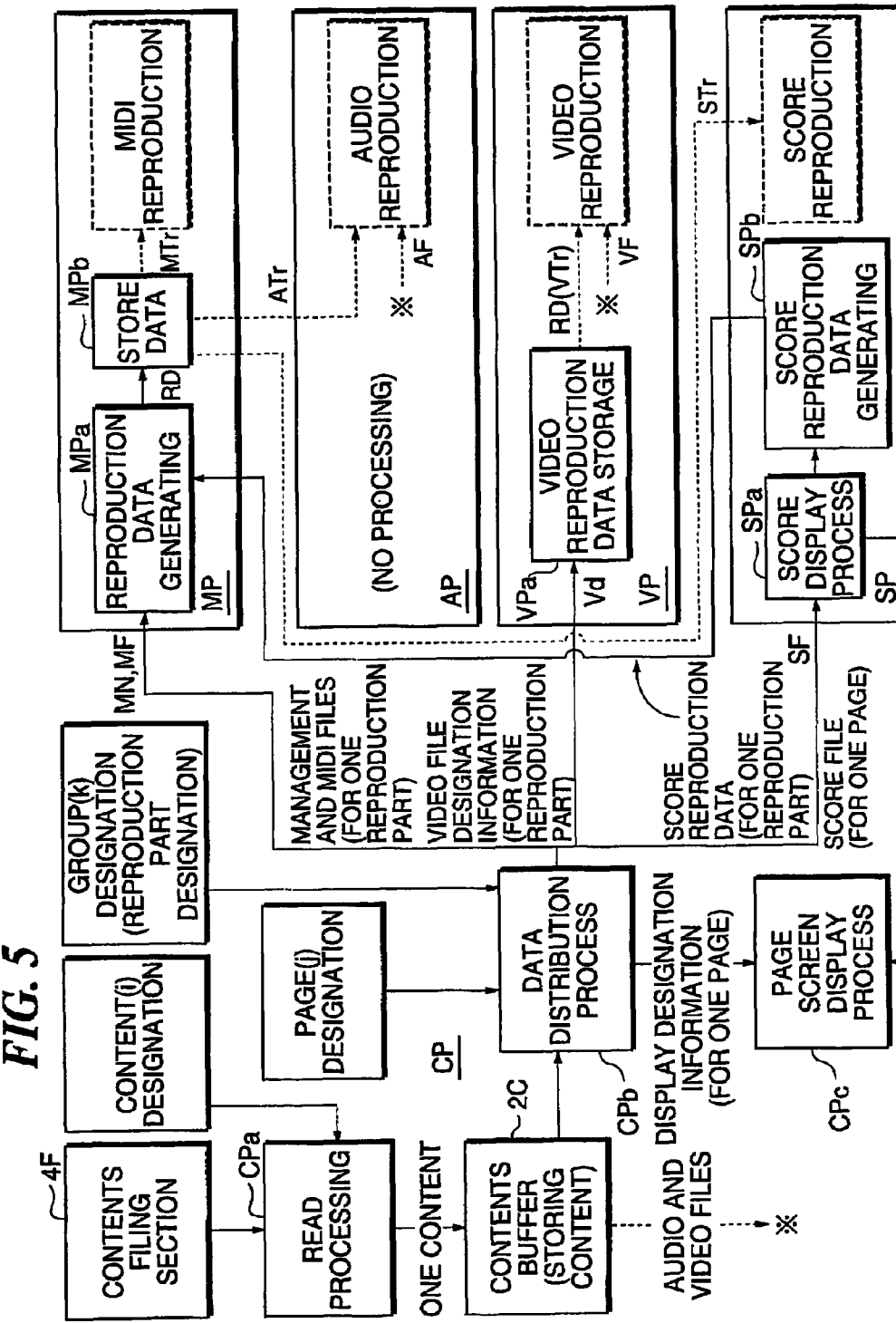
FIG. 5 is a functional block diagram schematically showing functions of the performance information reproducing apparatus that are used in a setting operation mode.

FIG. 5 is a functional block diagram schematically showing functions used in the setting operation mode of the performance information reproducing apparatus. In FIG. 5, broken lines represent parts that are activated to function in the reproduction operation mode (described later with reference to FIG. 12).

Now, a brief description will be given of the functions of the performance information reproduction system according to the present embodiment with reference to FIG. 5. In this performance information reproduction system, various types of media information (performance information) data files MF, AF, VF, and SF are stored in the contents filing section 4F or the like together with management files MN that manage the reproduction manners of the data files MF, AF, VF, and SF. When synchronized reproduction of such media information is carried out, whenever reproduction is to be performed, first a reproduction data generating part MPa of a musical tone information (MIDI) reproducing program executing section MP generates, in accordance with one of the management files MN, reproduction data RD for enabling musical tone (MIDI) data files MF, score data files SF, and various other media (audio/video) data files AF, VF to be read out according to a musical tone information reproducing program. Then, reproducing parts of respective media information reproducing program executing sections MP, SP, AP, and VP reproduce the musical tones and score information of the generated reproduction data RD and also the media information of the other media data files AF, VF read out based on the reproduction data RD.

This will be described more in detail below. As shown in FIG. 5, this performance information reproduction system is comprised of a management program (browser program) executing section CP that manages the progress of the respective media information, and a plurality of media information reproducing program executing sections that carry out reproduction operations for respective media information independently in accordance with instructions from the management program executing section CP. For example, these media information reproducing program executing sections are comprised of the above-mentioned MIDI reproducing program executing section MP, an audio reproducing program executing section AP, a video reproducing program executing section VP, and a score reproducing program executing section SP.

The management program (browser program) executing section CP carries out management control of respective files in accordance with the management program stored in the ROM 3 to manage the contents buffer 2C provided in the processing buffer (RAM) 2. Also, during a setting operation by the performance information reproducing apparatus, a read processing section CPa, a data distribution processing section CPb and a page screen display processing section CPc actively function.

The MIDI reproducing program executing section MP operates in response to control instructions from the management program executing section CP to process performance information of a predetermined MIDI file MF in accordance with the MIDI reproducing program, and manages the reproduction data buffer 2M reserved in the processing buffer 2. The MIDI reproducing program executing section MP also performs control required for processing related to other media files AF, VF, and SF, and during a setting operation by the performance information reproducing apparatus, activates modular functions of the reproduction data generating section MPa and a reproduction data storage section MPb.

Based on control instructions from the management program executing section CP and information from the MIDI reproducing program executing section MP, the audio reproducing program executing section AP and the video reproducing program executing section VP process, respectively, sound wave information of a designated audio file AF and image information of a designated video file VF according to the audio reproducing program and the video reproducing program. During a setting operation by the performance information reproducing apparatus, the audio reproducing program executing section AP does not have an activated module, but the video reproducing program executing section VP has a video reproduction data conversion/storage section VPa activated. The video reproducing program executing section VP also manages a video control data buffer 2V in the processing buffer 2.

Based on control instructions from the management program executing section CP and information from the MIDI reproducing program executing section MP, the score reproducing program executing section SP processes score information of a designated score file SF according to the score reproducing program. During a setting operation by the performance information reproducing apparatus, the score reproducing program executing section S activate functions of a score display processing section SPa and a score reproduction data generating section SPb.

Next, a description will be given of (1) a setting process carried out by the management program executing section CP, (2) processing by the respective reproducing program executing sections MP, AP, VP, and SP in the setting operation mode, and (3) a MIDI generation process carried out by the MIDI reproducing program executing section MP in that order with reference to FIGS. 6 to 11.

(1) Setting Process by Management Program Executing Section CP

The setting process by the management program executing section CP is carried out during a setting operation by the performance information reproducing apparatus. A user sets the performance information reproducing apparatus into the setting operation mode and designates a desired contents number (i) and a page (j) in the contents (i) by operating a predetermined operator of the operator device 11 in response to a contents menu with a tree structure that has been displayed in a guide screen on the display section 12. Responsive to this designation, the read processing section CPa of the management program executing section CP first reads a single contents file CFi corresponding to the designated content number "i", out of the contents files CF1 to CFn recorded in the contents filing section 4F of the external storage device 4 and a contents storage area of the ROM 3, that is, reads a management file MNi, MIDI files MFi, audio files AFi, video files VFi, and score files SFi included in the contents CFi and stores the files in the contents buffer 2C.

Next, the data distribution processing section CPb initializes all group data GDj1, Gdj2, . . . included in page data PDj corresponding to the designated page j to display the initialized data in the page screen display processing section CPc. That is, the data distribution processing section CPb reads out all the group data GDj1, Gdj2, . . . of the page j from the management file MNi of the contents file CFi stored in the contents buffer 2C and sends the readout data to the page screen display processing section CPc.

The page screen display processing section CPc determines, based on the display instruction information Cd for all groups (the initialized groups Gdji, Gdj2, . . . ) in the page j, display positions and display states of media information and the like to be displayed on the display screen, and displays a page screen in accordance with all the group data Gdji, Gdj2, . . . on the display section 12 in an arrangement shown in FIG. 7, for example. Although a media display window for displaying media information such as video images and score images (drawing) for the groups is blank in FIG. 7, there is also the case where media initial display data prepared in advance in the display instruction information Cd is displayed. It should be noted that a title of a group and brief comments provided by the display instruction information Cd are displayed in the display area marked "other display" in FIG. 7.

The data distribution processing section CPb transfers score files (for one page) designated by the score file designating information Sd of all of the group data GDji, Gdj2, . . . to the score reproducing program executing section SP. The score reproducing program executing section SP generates score display information (image data or drawing data for a score static display part) representing respective group scores of the transferred score files (for one page) SFi, and transfers the score display information to the page screen display processing section CPc. Responsive to this, the page screen display processing section CPc carries out processing of incorporating static score images expanded based on the score display information into respective group score display areas in the page screen to thereby display a score image SC such as one shown as a first group (one reproduction part) of the page screen in FIG. 7. It should be noted that in the page screen shown in FIG. 7, the score image SC is displayed simply using only a staff, with a second and subsequent pages also being simplified and displayed on a reduced scale. Also, by operating a scroll button in the operator device 11, the user can scroll this page screen to have a desired group displayed.

Here, if the user refers to the display of the page screen and performs an operation to designate a desired group (reproduction part) "k" to be reproduced out of all the initialized groups 1, 2, . . . for the present page j, the data distribution processing section CPb transfers, to the MIDI reproducing program executing section MP, a part of the management file MNi corresponding to the designated reproduction part, that is, group data Gdjk of the designated page data PDj corresponding to the group k, and a MIDI file MFia (where "a" represents an individual file designated within the MIDI files MFi) for one reproduction part designated by the MIDI file designation information Md of the group data Gdjk, and also transfers the control designation information Cd and the video file designation information Vd of the part of the management file MNi corresponding to the designated reproduction part, that is, the group data Gdjk, to the video reproducing program executing section VP.

Figure 6:
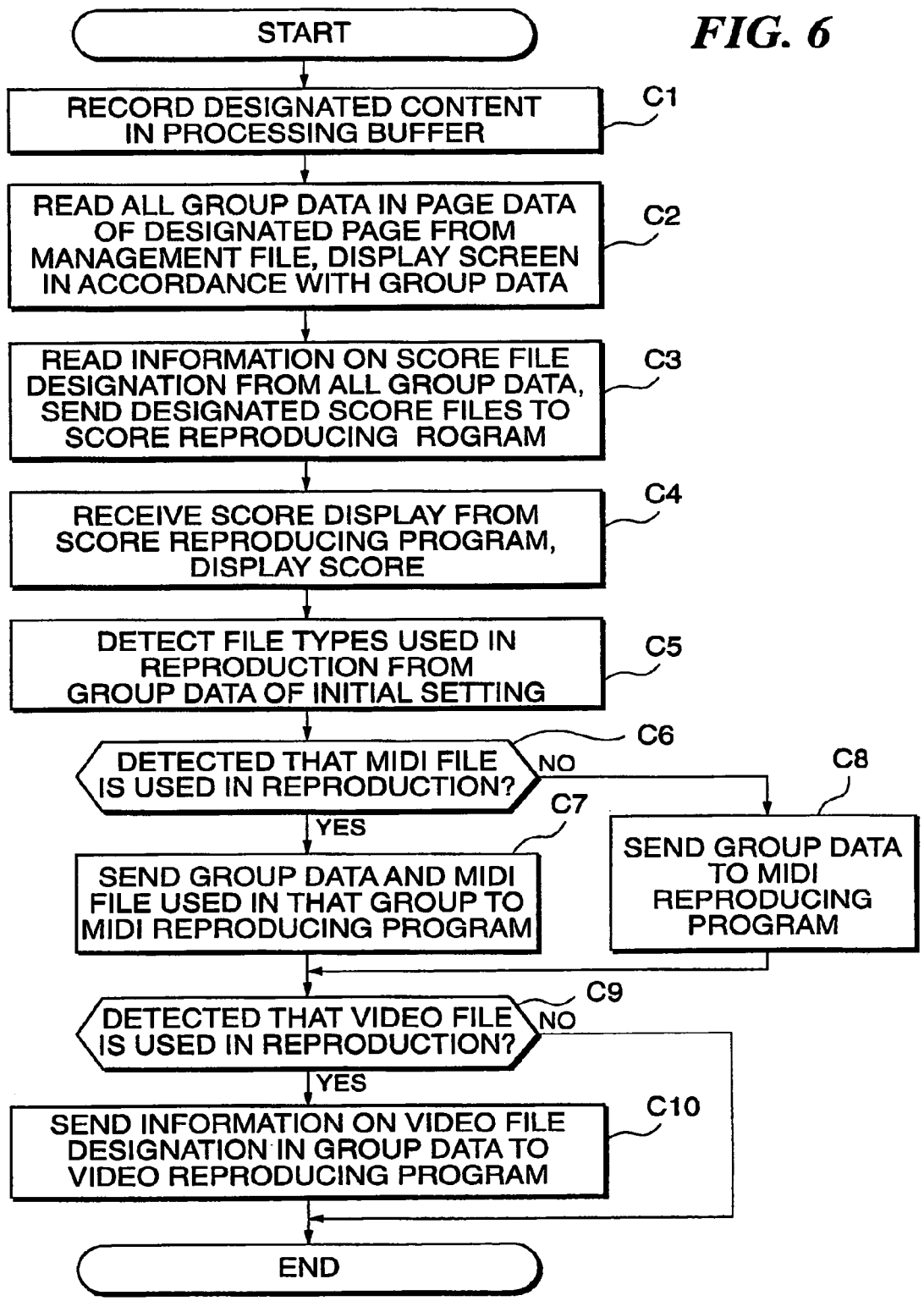
FIG. 6 is a flowchart showing the procedure of a setting process (browser process) carried out by a management program executing section CP.

FIG. 6 is a flowchart showing the procedure of the setting process (browser process) carried out by the management program executing section CP mentioned above. When the setting process (browser process) is started in accordance with the management program, first the read processing section CPa reads the designated contents CFi from the contents filing section 4F and records the contents CFi in the contents buffer 2C (step C1). Then, the data distribution processing section CPb reads all of the group data Gdj1, Gdj2, . . . in the page data PDj of the designated page from the management file MNi of the content CFi recorded in the contents buffer 2C, and causes the page screen display processing section CPc to display a page screen in accordance with the group data Gdj1, Gdj2, . . . on the display section 12 (step C2).

The data distribution processing section CPb also reads the score file designation information Sd from all of the group data Gdj1, Gdj2, . . . and sends the score file SFia designated by the score file designation information Sd to the score reproducing program executing section SP (step C3). Responsive to this, the score reproducing program executing section SP generates score display information and sends the score display information to the management program executing section CP, which receives the score display information and displays scores in corresponding areas on the page screen based on the score display information (step C4). In this way, the scores SC of all of the groups (1, 2, . . . ) included in the designated page (j) are displayed (see FIG. 7. Note that FIG. 7 shows only a simplified display and that at this stage, a cursor CL is not shown.)

Here, if the user performs an operation to designate or change a group k to be reproduced, the newly designated or changed group k is set as an object to be reproduced and the following process is carried out for the group data Gdjk corresponding to the group k. First, processing for detecting file types (MF, AF, VF, SF) to be used in the reproduction from the group data GDj1, GDj2, . . . that have been initialized is carried out (step C5).

First, it is determined from the designation contents of the MIDI file designation information Md whether a MIDI file (MF) should be used for reproduction (step C6), and when a MIDI file (MP) should be used for reproduction ("YES" to the step C6), the group data Gdjk and a MIDI file MFia corresponding to the group k are sent to the MIDI reproducing program executing section MP (step C7). When it is determined that no MIDI file (MF) should be used for reproduction ("NO" to the step C6), the group data Gdjk is sent to the MIDI reproducing program executing section MP (step C8).

After the data has been transmitted to the MIDI reproducing program executing section MP (steps C7, C8), the designation contents of the video file designation information Vd is checked to determine whether it has been detected that a video file VF should be used for reproduction (step C9). Here, when it is determined that a video file VF should be used for reproduction ("YES" to the step C9), processing for sending the video file designation information Vd in the group data Gdjk to the video reproducing program executing section VP is carried out (step C10), and then the setting process (browser process) is terminated. On the other hand, when it is determined that no video file VF should be used for reproduction ("NO" to the step C9), the setting process is terminated immediately.

(2) Processing by Respective Reproducing Program Executing Sections MP to SP in Setting Operation Mode Next, the operations of the respective reproducing program executing sections MP to SP in the setting operation mode of the performance information reproducing apparatus will be described. In FIG. 5, first, in the score reproducing program executing section SP, the score display processing section SPa generates the score display information (image data or drawing data for the score static display part) based on the score file SFi (for one page) sent from the data distribution processing section CPb of the management program executing section CP as described above, and transfers the score display information to the page screen display processing section CPc of the management program executing section CP. Further, the score reproduction data generating section SPb generates score reproduction data by extracting a data part of a movable display part (note/rest event) of the score, out of the score information of one reproduction part of the score file SFi (for one page) corresponding to the group k, and transfers the generated score reproduction data to the reproduction data generating section MPa of the MIDI reproducing program executing section MP.

Figure 8A:
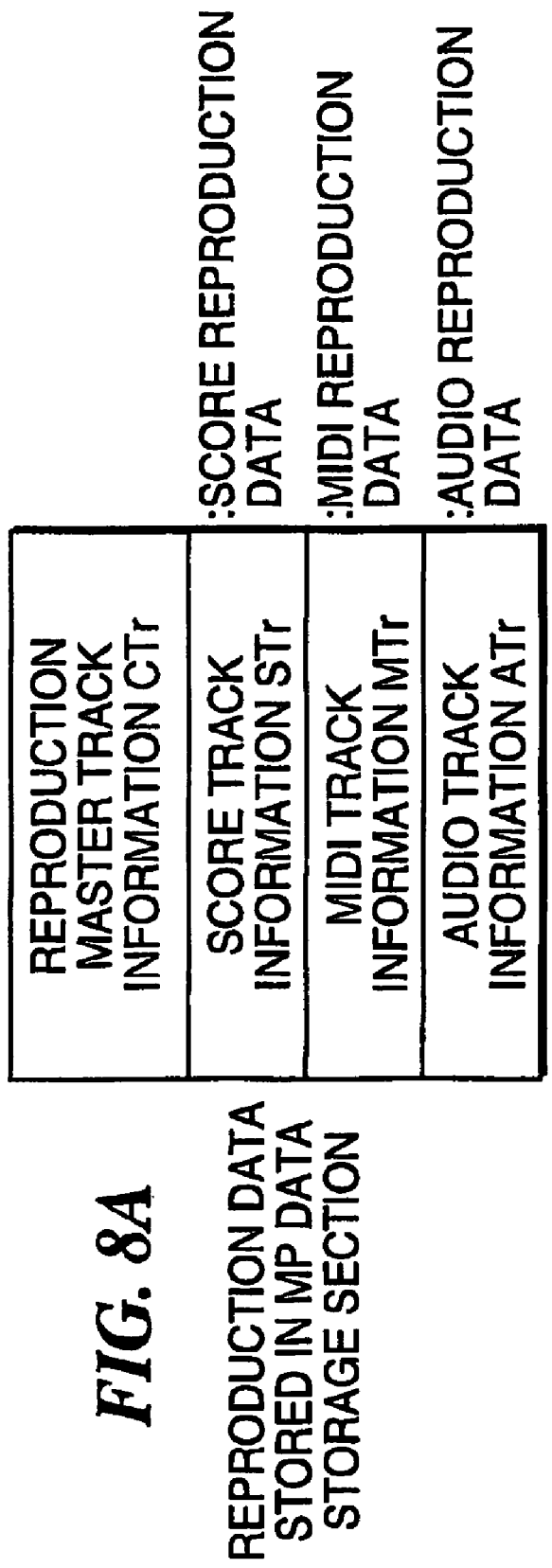

In the MIDI reproducing program executing section MP, the reproduction data generating section MPa generates audio reproduction data and MIDI reproduction data based on one reproduction part (group data) Gdjk of the management file Mni and the MIDI file MFia of one reproduction part transferred from the data distribution processing section CPb, and also generates reproduction data RD as shown in FIG. 8A, for example, by combining the above generated data with the score reproduction data from the score reproduction data generating section SPb. The reproduction data RD generated by the reproduction data generating section MPa is stored in the reproduction data buffer 2M by the reproduction data storage section MPb.

The reproduction data generating section MPa generates audio reproduction data ATr synchronous with MIDI clock timing based on the audio file designation information Ad (see FIG. 3) of the designated group data Gdjk of the management file MNi. As is learned from this, during a setting operation by the performance information reproducing apparatus, the audio reproducing program executing section AP receives no data distributed from the data distribution processing section CPb, and therefore the audio reproducing program executing section AP does not carry out any processing on contents data.

Figure 8B:

On the other hand, as for the video file designation information Vd (see FIG. 3), to reduce a burden upon the reproduction data generating section MPa of the MIDI reproducing program executing section MP, the video file designation information Vd (see FIG. 3) is processed by the video reproduction data conversion/storage section VPa of the video reproducing program executing section VP. That is, the video reproduction data conversion/storage section VPa generates video reproduction data VTr as shown in FIG. 8B from the video file designation information Vd of one reproduction part (the designated group data Gdjk of the management file MNi) distributed from the data distribution processing section CPb, and stores the generated video reproduction data VTr in the video control data buffer 2V.

The reproduction data RD generated by the reproduction data generating section MPa and stored in the reproduction data buffer 2M by the reproduction data storage section MPb is described, for example, in the SMF (Standard MIDI File) format in accordance with the musical tone information format of the MIDI file MF, and in the example in FIG. 8A, is comprised of reproduction master track information CTr, score MIDI track (score track) information STr, MIDI track information MTr, and audio track information ATr. The video reproduction data generated by the video reproduction data conversion/storage section VPa and stored in the video control data buffer 2V is also described in the SMF format, as shown in FIG. 8B.

The score track information STr is score reproduction data that is used itself in reproduction of a score. The MIDI track information MTr is MIDI reproduction data that is used itself in reproduction of musical tone information. That is, as shown in FIG. 9A, the both types of track information STr, MTr are each comprised of pairs of MIDI clock timing MCp1, MCp2, . . ., and MIDI events EVp1, EVp2, . . . that should be generated in that MIDI clock timing, the pairs being arranged in the order of the MIDI clock timing. In the present embodiment, the score track information STr is generated by converting display position information (such as DP11 in the lower-right part of FIG. 4) of note/rest events (movable parts) extracted from score reproduction data, that is, a score file SFia. Such score track information STr is used to schematically display progress of performance of music tone information of the MIDI track information MTr in terms of movement of the cursor CL (see FIG. 7).

On the other hand, the audio track information ATr is audio reproduction data that specifies reproduction start timing of sound wave information in terms of MIDI clock timing and designates audio files AFia, AFib, . . . to be reproduced in MIDI clock timing. That is, as shown in FIG. 9B, the audio track information ATr is comprised of pairs of MIDI clock timing MCq1, MCq2, . . . , and designated audio filenames AFq1, AFq2, . . . to be reproduced in that MIDI clock timing, the pairs being arranged in the order of the MIDI clock timing.

The respective MIDI clock timing MCq1, MCq2, . . . are obtained by converting timing data Tm1, Tm2, . . . of the audio file designation information Ad of the group data Gdjk to MIDI clock timing. The respective designated audio filenames AFq1, AFq2, . . . are copied from designated filenames Fn1, Fn2, . . . of the audio file designation information Ad and therefore information that designate individual audio files AFia (the contents of which is shown in the second part of the right column in FIG. 4) described above.

As is the case with the track information ATr for audio reproduction data, the video reproduction data in FIG. 8b is track information VTr in which video files are associated with MIDI clock timing. As shown in FIG. 9C, the video track information VTr is comprised of pairs of a MIDI clock timing MCr1, MCr2, . . . , and designated video filenames VFr1, VFr2, . . . that are to be reproduced in that MIDI clock timing, with such pairs being arranged in the order of the MIDI clock timing. In the same way as the audio track information ATr, the video track information VTr is generated from the video file designation information Vd of the group data Gdjk. That is, the MIDI clock timing MCr1, MCr2, . . . are obtained by converting timing data Tm1, Tm2, . . . of the video file designation information Vd to MIDI clock timing, and the designated video filenames VFr1, VFr2, . . . are copied from the designated filenames Fn1, Fn2, . . . , and therefore designate individual video files VFia (the contents of which is shown in the third part of the right column of FIG. 4).

(3) MIDI Generation Processing by MIDI Reproducing Program Executing Section MP

Figure 10:
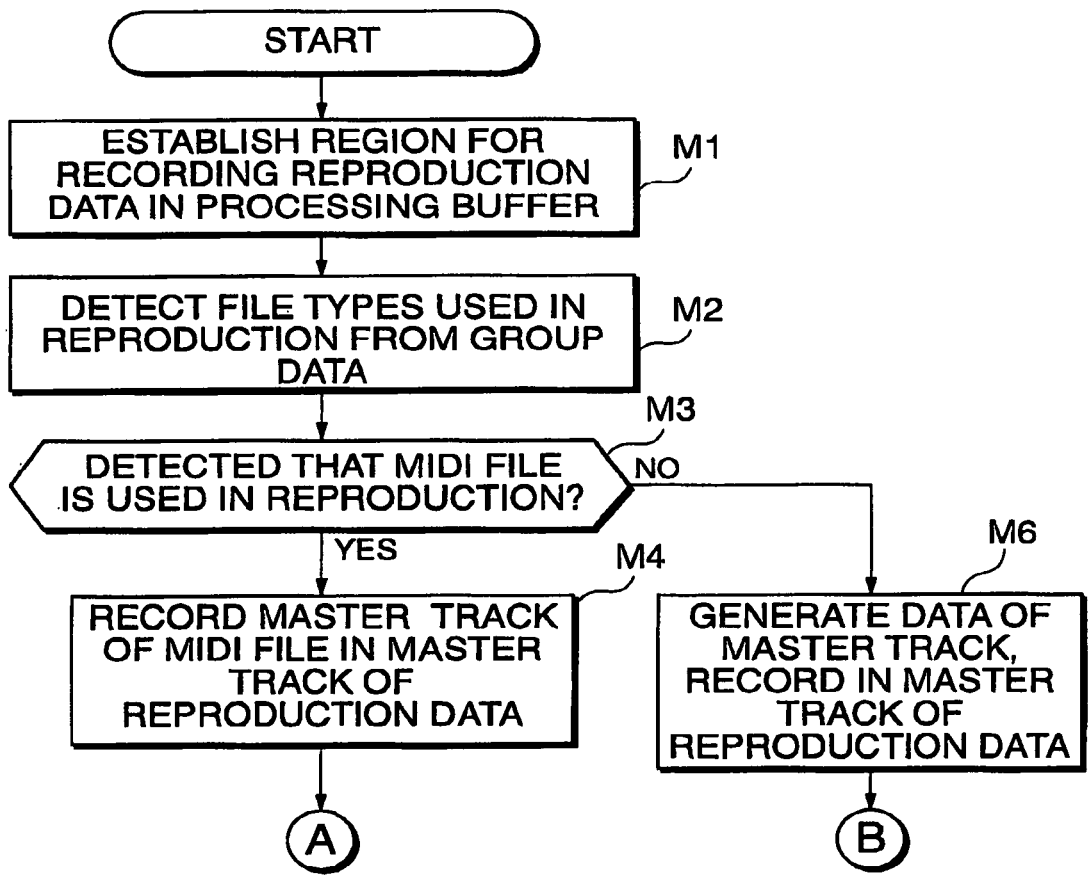
FIG. 10 is a flowchart showing the procedure of a MIDI generation process carried out by a MIDI reproducing program executing section MP.
Figure 11:
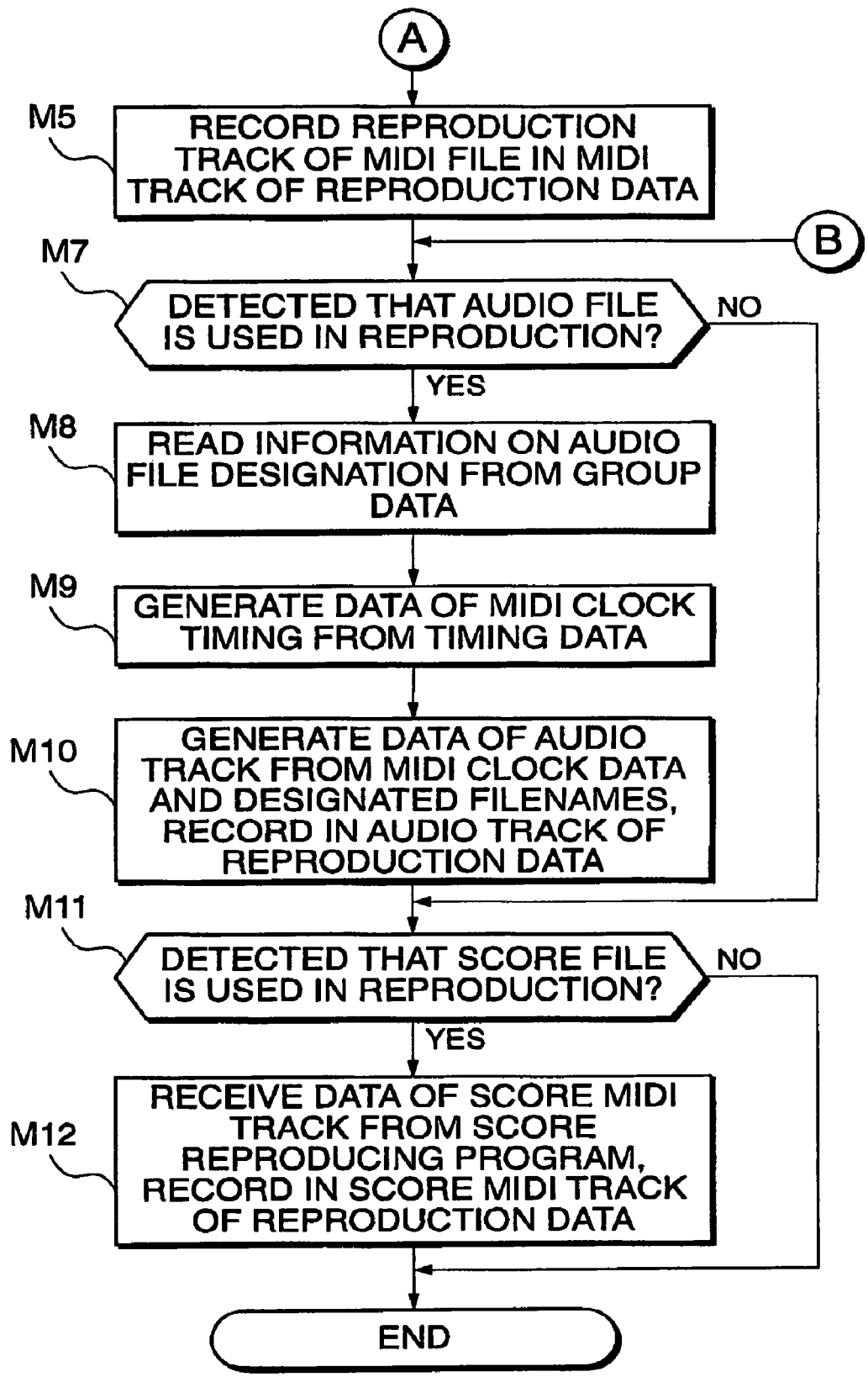
FIG. 11 is a continued part of the FIG. 10 flowchart.

FIGS. 10 and 11 are flowcharts showing the procedure of a MIDI generation process carried out by the MIDI reproducing program executing section MP. When the MIDI generation process is started according to the MIDI reproducing program, first the reproduction data generating section MPa of the MIDI reproducing program executing section MP reserves the reproduction data buffer 2M, which is an area for recording the reproduction data RD, in the processing buffer (RAM) 2 (step M1). Next, processing for detecting file types (MF, AF, VF, SF) to be used in reproduction from the media designation information Md, Ad, Vd, and Sd of the designated group data Gdjk from the data distribution processing section CPb is carried out (step M2).

First, it is determined whether it has been detected that a MIDI file (MF) is to be used for reproduction, from the designated contents of the MIDI file designation information Md (step M3). Here, when a MIDI file (MF) is to be used for reproduction ("YES" to the step M3), information on the master track CT in the MIDI file MFia designated by the MIDI file designation information Md is set as the master track information CTr of the reproduction data RD, and the master track information CTr is recorded in a master track area of the reproduction data buffer 2M by the reproduction data storage section MPb (step M4). Further, the master track information CTr information on the reproduction track RT in the MIDI file MFia is recorded in a MIDI track area of the reproduction data buffer 2M as the MIDI track information MTr by the reproduction data storage section MPb (step M5 in FIG. 11).

When it is determined that no MIDI file (MF) is to be used for reproduction ("NO" to the step M3 in FIG. 10), master track information CTr is newly generated according to timing setting information in the control instruction information Cd and the generated master track information CTr is recorded in the master track area of the reproduction data buffer 2M by the reproduction data storage section MPb (step M6).

After the master track information CTr has been recorded (the steps M5, M6), it is determined whether it has been detected that an audio file (AF) is to be used for reproduction, from the designation contents of the audio file designation information Ad (step M7 in FIG. 11). Here, when it is determined that an audio file (AF) is to be used for reproduction ("YES" to the step M7), the audio file designation information Ad is read from the group data Gdjk (step M8) and MIDI clock timing data MCq1, MCq2, . . . are generated from the timing data Tm1, Tm2, . . . of the read audio file designation information Ad (step M9). Further, audio track information ATr comprised of the MIDI clock timing data MCq1, MCq2, . . . and designated filenames AFq1, AFq2, . . . is generated and recorded in an audio track area of the reproduction data buffer 2M by the reproduction data storage section MPb (step M10).

After the audio track information ATr has been recorded (the step M10) or when it is determined that an audio file (AF) is not to be used for reproduction ("NON" to the step M7), it is determined whether it has been detected that a score file (SF) is to be used for reproduction, from the designation contents of the score file designation information Sd (step M11). Here, when it is determined that a score file (SF) is to be used for reproduction ("YES" to the step M11), score reproduction data is received from the score reproduction data generating section SPb of the score reproducing program executing section SP and the received score reproduction data is recorded in a score track area of the reproduction data buffer 2M as the score MIDI track information STr by the reproduction data storage section MPb (step M12). After the recording processing for the score MIDI track information STr has been carried out (the step M12), the MIDI generation process is terminated. Also, when it is determined that no audio file (AF) is to be used for reproduction ("NO" to the step M11), the MIDI generation process is terminated immediately.

Figure 12:
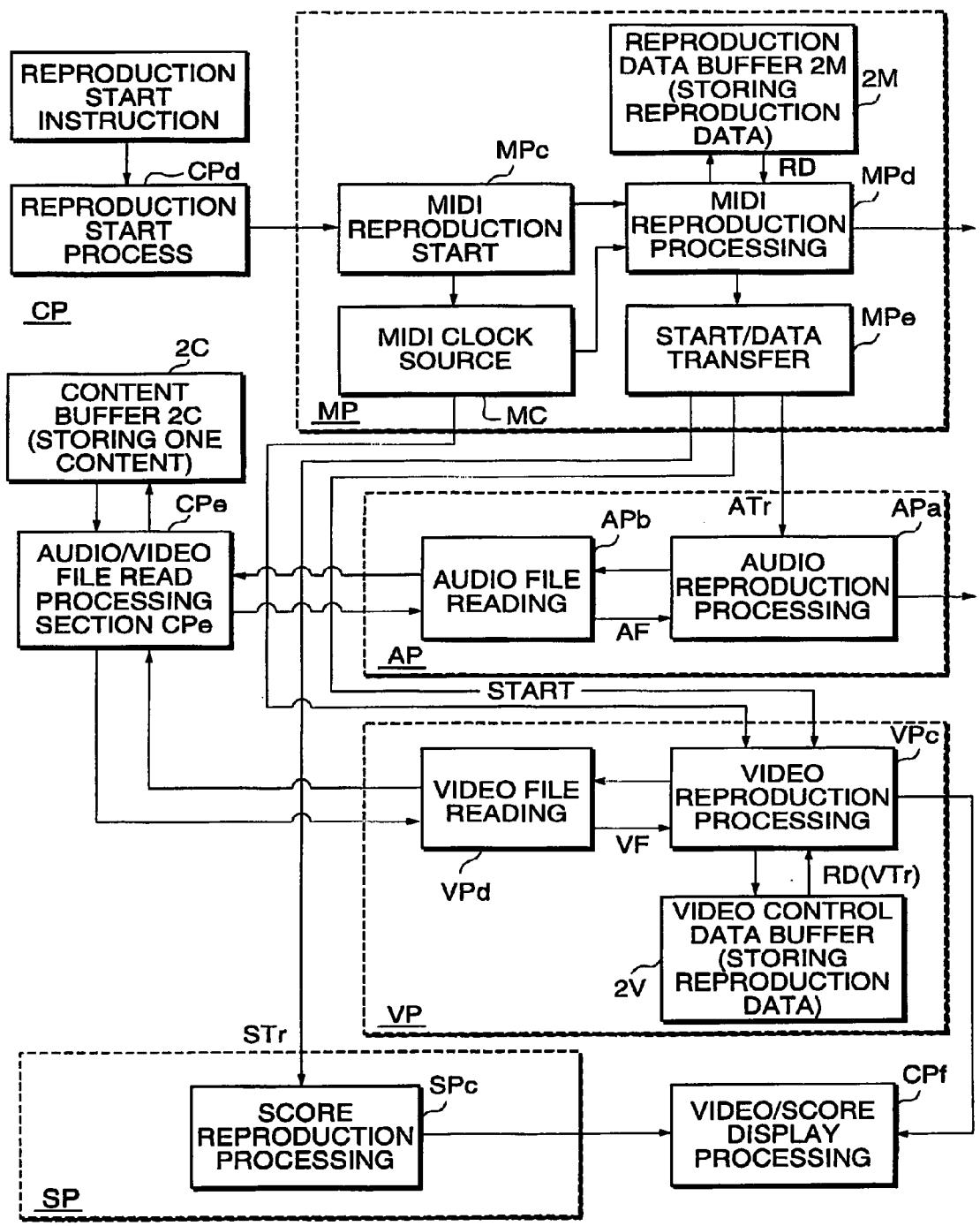
FIG. 12 is a functional block diagram schematically showing functions of the performance information reproducing apparatus that are used during a reproduction operation.

During a reproduction operation, the performance information reproducing apparatus uses the reproduction data RD generated as described above during a setting operation to carry out synchronized reproduction of various performance information (media information) according to a MIDI file MP and other media files AF, VF, and SF in a reproduction manner corresponding to the contents of a management file MN. FIG. 12 is a functional block diagram schematically showing functions of the performance information reproducing apparatus that are used during a reproduction operation.

After the operation settings have been completed, when the user operates a reproduction switch RS on the page screen (see FIG. 7) using a predetermined operator of the operator device 11 to give an instruction for starting reproduction, a start instruction processing section CPd of the management program executing section CP, which gives instructions for starting and stopping a reproduction operation of the performance information reproducing apparatus, instructs the MIDI reproducing program executing section MP to start reproduction and hence causes the performance information reproducing apparatus to start a reproduction operation.

In the MIDI reproducing program executing section MP, responsive to this reproduction start instruction, a MIDI reproduction start processing section MPc, which gives instructions for starting and stopping operation of the MIDI reproducing program executing section MP, activates a MIDI clock source MC and a MIDI reproduction processing section MPd. The MIDI reproduction processing section MPd reads the reproduction data RD from the reproduction data buffer 2M in accordance with a MIDI clock from the MIDI clock source MC.

That is, whenever each MIDI clock timing MCp1, MCp2, . . . in the MIDI track information MTr of the reproduction data RD is reached, the contents of MIDI event data EVp1, EVp2, . . . in the same MIDI track information MTr is outputted to the tone generator circuit 7 and the effect circuit 8 as musical tone information. At the same time, an operation start instruction is issued to a start/data transfer section MPe, and whenever each MIDI clock timing MCq1, MCq2, . . . in the audio track information ATr and MIDI clock timing MCp1, MCp2, . . . in the score track information STr of the reproduction data RD are reached, a designated audio filename AFq1, AFq2, . . . and a score MIDI (cursor) event EVp1, EVp2, . . . are sent to the start/data transfer section MPe.

In accordance with control instructions from the MIDI reproduction processing section MPd, the start/data transfer section MPe instructs the other program executing sections AP, VP, and SP to start and stop operations. When an operation start (activate) instruction has been issued, the start/data transfer section MPe sends the designated audio filenames AFq1, AFq2, . . . and the score MIDI events EVp1, EVp2, . . . respectively to the audio reproducing program executing section AP and the score reproducing program executing section SP in the respective MIDI clock timing mentioned above. Also, in accordance with a reproduction start instruction from the MIDI reproduction start processing section MPc, a MIDI clock is transmitted from the MIDI clock source MC to the video reproducing program executing section VP.

An audio reproduction processing section APa of the audio reproducing program executing section AP starts operation according to the activate instruction from the start/data transfer section MPe. Whenever each MIDI clock timing MCq1, MCq2, . . . is reached, one of audio files AFia, AFib, . . . (based on the audio file designation information Ad of the page data Pdjk in the contents CFi) designated by a corresponding one of the designated audio filenames AFq1, AFq2, . . . that have been received is read from the contents buffer 2C via an audio file reading section APb and an audio/video file read processing section CPe of the management program executing section CP, and the contents of the audio file AFia, AFib, . . . is outputted to the effect circuit 8 as sound wave information.

A video reproduction processing section VPc of the video reproducing program executing section VP starts operation according to the activate instruction from the start/data transfer section MPe, reads video reproduction data, that is, the video track information VTr, from the video control data buffer 2V in accordance with the MIDI clock from the MIDI clock source MC, reads a video file (VF) corresponding to the read video track information VTr, and transfers the video file to a video/score display processing section CPf of the management program executing section CP.

That is, whenever each MIDI clock timing MCr1, MCr2, . . . in the video track information VTr is reached, the video reproduction processing section VPc reads out one of video files VFia, VFib, . . . (based on the video file designation information vd in the page data Pdjk of the contents CFi) designated by a corresponding one of designated video filenames VFr1, VFr2, . . . in the video track information VTr via a video file reading section VPd and the audio/video file read processing section CPe, and outputs the contents of the video file VFia, VFib, . . . to the video/score display processing section CPf as image information.

A score reproduction processing section SPc of the score reproducing program executing section SP starts operation according to the activate instruction from the start/data transfer section MPe, and whenever each MIDI clock timing MCp1, MCp2, . . . in the score track information STr is reached, outputs the contents of one of the received score MIDI (cursor) event data EVp1, EVp2, . . . to the video/score display processing section CPf as movable score (cursor) information.

The video/score display processing section CPf of the management program executing section CP displays images based on the image information received from the video reproduction processing section VPc and a movable score (cursor) based on the movable score information received from the score reproduction processing section SPc in respective display areas of the page (j) in the page screen. For example, for the first group (k=1) in the page screen in FIG. 7, in accordance with the movable score information, a cursor image CL representing the present musical tone performance position is displayed in synchronism with the reproduction operation. It should be noted that the display manner of the displayed movable score is not limited to a cursor image, it is also possible to use a method in which a flashing display is used for a note/rest image of a note or a rest being reproduced in the displayed score, or the color or luminance of the present note/rest image is changed for emphasis.

Also, during reproduction and after the reproduction has been completed, if the user operates a stop switch SS on the page screen using a predetermined operator of the operator device 11 to instruct stop of a reproduction, the start instruction processing section CPd of the management program executing section CP issues an instruction to stop the reproduction operation of the performance information reproducing apparatus, so that the MIDI reproduction start processing section MPc of the MIDI reproducing program executing section MP receives the instruction and instructs the MIDI clock source MC and the MIDI reproducing program executing section MP to stop operation, so that the reproduction operation of the performance information reproducing apparatus is terminated. In this case, the reproduction operation can be restarted by another operation of the reproduction switch RS, or another contents (i), page (j), group (k) can be designated and a new setting operation can be carried out.

As described above, according to the first embodiment, read manners (filenames, timing, and the like) for various media information are set in advance in a management file, and when reproduction is carried out, the management file is used to easily generate reproduction data for reading the various media information and the various media information can then be read out in accordance with the reproduction data. As a result, synchronized reproduction of media information can be realized with ease. Further, an editing operation for a management file that specifies reproducing manners of the various media information is simple, so that by editing the management file, for example, to change some of the data files and/or add new data files or to change the reproduction timing of respective media files, it is possible to flexibly set a desired reproducing manner.

A second embodiment of the present invention will now be described with reference to FIG. 13.

Although in the first embodiment described above, the video reproduction data (video track information) VTr out of the reproduction data RD is generated by the video reproducing program executing section VP, the second embodiment differs in that the MIDI reproducing program executing section MP generates reproduction data RD including the video track information VTr. FIG. 13 is a functional block diagram schematically showing functions of the performance information reproducing apparatus according to the second embodiment that are used during a setting operation.

In the performance information reproduction system according to the second embodiment, the video reproducing program executing section VP has the same construction as the audio reproducing program executing section AP. During a setting operation, the video reproduction data (video track information) VTr is generated and stored by the MIDI reproducing program executing section MP, so that as shown in FIG. 13, no data is distributed to the video reproducing program executing section VP from the data distribution processing section CPb and no processing is carried out for contents data by the video reproducing program executing section VP. Accordingly, there is no need to reserve the video control data buffer 2V (see FIG. 12) in the processing buffer (RAM) 2 as in the first embodiment.

On the other hand, the reproduction data generating section MPa of the MIDI reproducing program executing section MP also generates the video track information VTr synchronous with MIDI clock timing based on the video file designation information Vd in the designated group data Gdjk in the management file MNi, in the same way as the audio reproduction data (audio track information) ATr.

Figure 13:
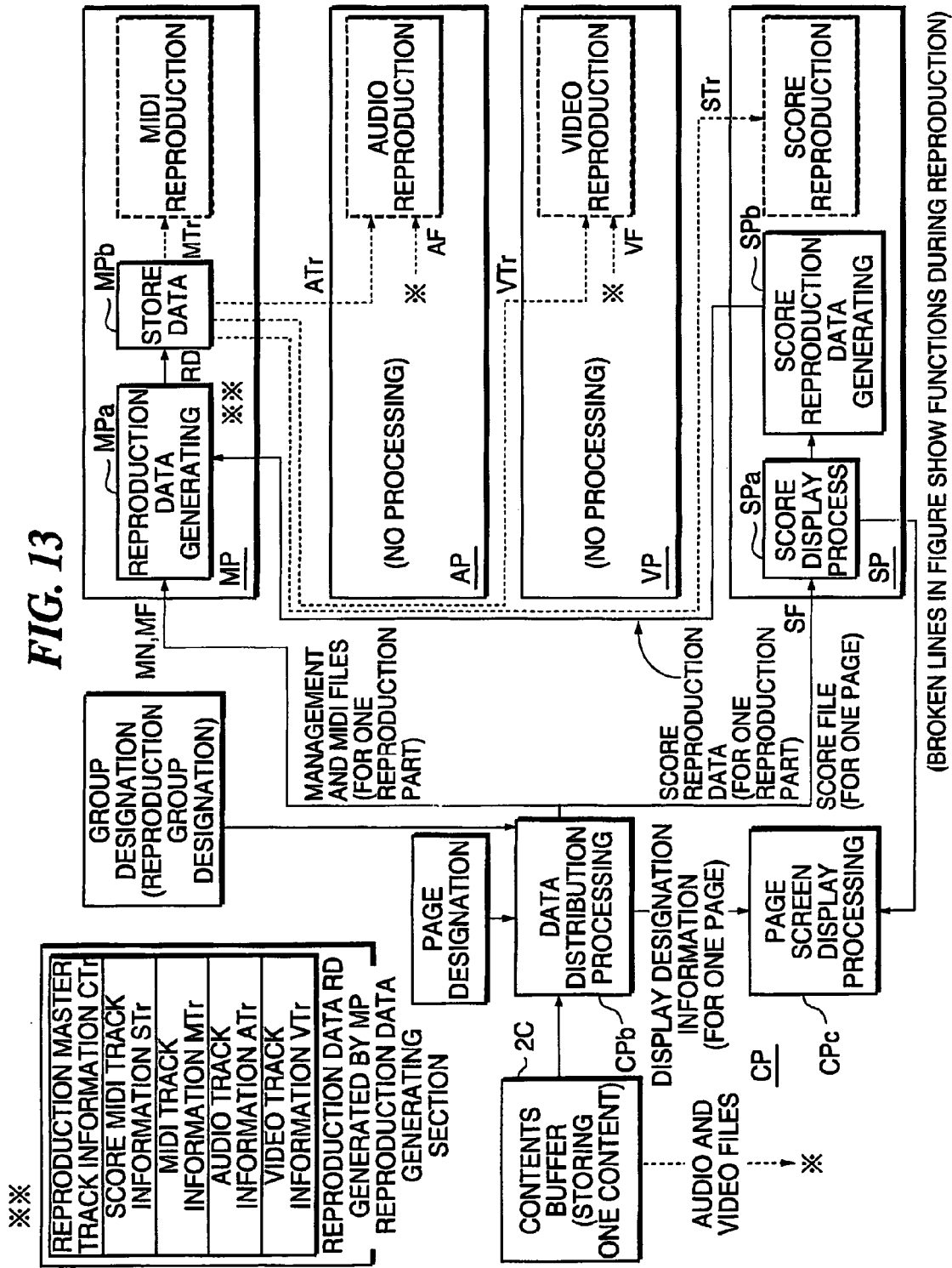
FIG. 13 is a functional block diagram schematically showing functions of a performance information reproducing apparatus according to a second embodiment of the present invention that are used during a setting operation.

That is, in the reproduction data generating section MPa, reproduction data RD including all of the media track information MTr, ATr, VTr, and STr corresponding to all of the media files MF, AF, VF, SF is generated, as shown in an upper-left part of FIG. 13 (in which the same contents as in FIG. 9 are shown).

The reproduction operation of the performance information reproducing apparatus according to the present embodiment will now be described with reference to FIG. 12. The video reproduction processing section VPc of the video reproducing program executing section VP receives an activation instruction from the start/data transfer section MPe, starts operation, receives the video track information VTr from the video control data buffer 2V, and carries out the same operation as the audio reproduction processing section APa. Therefore, the video reproducing program executing section VP does not need to be supplied with a MIDI clock from the MIDI clock source MC. It should be noted that there are no other particular differences in structure from the example in FIG. 12.

That is, whenever each MIDI clock timing MCr1, MCr2, ... in the video track information VTr is reached, one of video file VFia, VFib, ... designated by the corresponding designated video filename VFq1, VFq2, ... sent from the start/data transfer section MPe is read from the contents buffer 2C via the video file reading section (VPd) and the audio/video file read processing section CPe of the management program executing section CP, and the contents of the read video files VFia, VFib, ... is outputted to the video/score display processing section CPf as image information.

As described above, according to the second embodiment, it is possible to achieve the same effects as those of the first embodiment described above, and further, since the generation and storage of the video reproduction data (video track information) VTr is assigned to the MIDI reproducing program executing section MP, the burden upon the video reproducing program executing section VP is reduced and there is no need to reserve a video control data buffer 2V in the processing buffer (RAM) 2, so that a free area in the processing buffer (RAM) 2 can be used for other processing.

The present invention is not limited to the first and second embodiments described above, and can be implemented in various ways. For example, although a single file is designated as each of the musical tone information and the score information for one reproduction part according to the first embodiment, a plurality of files may be designated as each of the musical tone information and the score information for one reproduction part. That is, if the MIDI file designation information Md and the score file designation information Sd have the same structure as the audio and video file designation information Ad, Vd shown in the lower-right part of FIG. 3, it is possible to designate a plurality of MIDI files MFia, MFib, ... and score files SFia, SFib, ... (where "a", "b", ... express individual files out of a plurality of files designated as the files MFi, SFi) for one reproduction part using the group data Gdjk for a single group. In this case, the MIDI clock timing (see FIG. 9) in the MIDI and score track information MTr, STr of the reproduction data RD corresponding to the MIDI files MFia, MFib, ... and score files SFia, SFib, ... are shifted by timing Tm1, Tm2, ... of the MIDI file designation information Md and the score file designation information Sd.

It goes without saying that the object of the present invention may also be accomplished by supplying a system or an apparatus with a storage medium (or a recording medium) in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of either of the above-mentioned embodiments on a computer, and the form of the program may be an object code, a program executed by an interpreter, or script data supplied to an OS.

Examples of the storage medium for supplying the program code include a RAM, an NV-RAM, a floppy (registered trademark) disk, an optical disk, a magnetic-optical disk, a CD-ROM, a CD-R, a CD-RW, a DVD (DVD-ROM, DVD-RAM, DVD-RW, or DVD+RW), a magnetic tape, a nonvolatile memory card, and a ROM. Alternatively, the program is supplied by downloading from another computer, a database, or the like, not shown, connected to the Internet, a commercial network, a local area network, or the like.

What is claimed is:

1. A performance information reproducing apparatus comprising:
   a file storage device that stores a musical tone data file, in which musical tone information is recorded, and a plurality of media data files, in which a plurality of types of media information is recorded, together with a management file in which a plurality of reading manners of the musical tone data file and the media data files are recorded;
   a reading manner specifying device that specifies a reading manner of the plurality of reading manners instructed by a user operation from the management file stored by the file storage device;
   a reproduction data generating device that generates, based on said reading manner specified by said reading manner specifying device, reproduction data that designates the musical tone information of the musical tone data file to be reproduced and the media data file to be reproduced, using designation information in a same format as the musical tone information;
   a reproduction data storage device that stores the generated reproduction data;
   a reading device that reads the reproduction data stored by said reproduction data storage device in accordance with a reproduction clock for the musical tone information; and
   a reproducing device that reads the media data file designated by the read reproduction data, and reproduces the musical tone information in the reproduction data and the media information in the media file in synchronism with each other.

2. A performance information reproducing apparatus according to claim 1, wherein the plurality of media data files, in which the plurality of types of media information are recorded, respectively, include an audio data file, and a video data file.

3. A performance information reproducing apparatus according to claim 1, wherein the management file includes file names of the plurality of media data files, and pieces of timing data indicative of a timing of start of reproduction of the plurality of media data files, the file names and the pieces of timing data being arranged in order of reproduction.

4. A performance information reproducing apparatus according to claim 3, wherein the musical tone data file includes MIDI events, and pieces of timing data indicative of a MIDI clock timing of a start of processing of the MIDI event, the MIDI events and the pieces of timing data being arranged in order of reproduction.

5. A performance information reproducing apparatus according to claim 4, wherein the reproduction data includes file names of the plurality of media data files, and pieces of timing data indicative of a MIDI clock timing of a start of reproduction of the media data files, the file names and the pieces of timing data being arranged in order of reproduction.

6. A performance information reproducing apparatus according to claim 5, wherein the timing data indicative of the MIDI clock timing of the start of reproduction of the media data files is generated from data indicative of a timing recorded in the management file.

7. A performance information reproducing apparatus according to claim 6, wherein the reproduction clock for the musical tone information is the MIDI clock, and wherein whenever a timing corresponding to the timing data indicative of the MIDI clock timing of the start of reproduction of the media data file is reached, the media data file having the file name corresponding to the MIDI clock timing is read from said file storage device.

8. A performance information reproducing method for a performance information reproducing apparatus, comprising:
   storing, in a file storage device, a musical tone data file, in which musical tone information is recorded, and a plurality of media data files, in which a plurality of types of media information is recorded, together with a management file in which a plurality of reading manners of the musical tone data file and the media data files are recorded;
   specifying the reading manner instructed by a user operation, from said management file stored by said file storage device;
   generating, based on said reading manner, reproduction data that designates the musical tone information of the musical tone data file to be reproduced and the media data file to be reproduced, using designation information in a same format as the musical tone information;
   storing the generated reproduction data;
   reading the stored reproduction data in accordance with a reproduction clock for the musical tone information; and
   reading the media data file designated by the read reproduction data, and reproducing the musical tone information in the reproduction data and the media information in the media data file in synchronism with each other.

9. A computer-readable storage medium having encoded thereon performance information reproducing program, which when executed by a computer, causes:
   storing in a file storage device a musical tone data file, in which musical tone information is recorded, and a plurality of media data files, in which a plurality of types of media information is recorded, together with a management file in which a plurality of reading manners of the musical tone data file and the media data files are recorded;

specifying a reading manner of the plurality of reading manners instructed by a user operation from the management file stored in the file storage device;

generating, based on said reading manner, reproduction data that designates the musical tone information of the musical tone data file to be reproduced and the media data file to be reproduced, using designation information in a same format as the musical tone information;

storing the generated reproduction data in a reproduction data storage device;

reading the reproduction data from the reproduction data storage device in accordance with a reproduction clock for the musical tone information; and reading the media data file designated by the read reproduction data, and reproducing the musical tone information in the reproduction data and the media information in the media data file in synchronism with each other.

* * * * *